(12) United States Patent
Bertz et al.

(10) Patent No.: US 12,155,534 B1
(45) Date of Patent: Nov. 26, 2024

(54) SERVICE COMMUNICATION PROXY (SCP) THAT SERVES NETWORK TOPOLOGY DATA

(71) Applicant: T-Mobile Innovations LLC, Overland Park, KS (US)

(72) Inventors: Lyle T. Bertz, Lee's Summit, MO (US); Laurent Alexandre Laporte, Spring Hill, KS (US); Tracy Lee Nelson, Overland Park, KS (US); Milind Gunjan, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/240,178

(22) Filed: Apr. 26, 2021

(51) Int. Cl.
| | |
|---|---|
| *H04W 28/02* | (2009.01) |
| *G06F 9/54* | (2006.01) |
| *H04L 12/28* | (2006.01) |
| *H04L 41/12* | (2022.01) |
| *H04W 40/24* | (2009.01) |

(52) U.S. Cl.
CPC .............. *H04L 41/12* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 9,843,913 B2 | 12/2017 | Dahan et al. | |
| 10,028,083 B2 | 7/2018 | Cui et al. | |
| 10,285,110 B2 | 5/2019 | Cui et al. | |
| 10,470,024 B2 | 11/2019 | Meredith et al. | |
| 10,523,354 B2 | 12/2019 | Si et al. | |
| 10,637,753 B1* | 4/2020 | Taft | H04L 41/04 |
| 10,764,187 B2 | 9/2020 | Dahan et al. | |
| 2021/0105191 A1* | 4/2021 | Yang | H04L 41/5009 |
| 2021/0211970 A1* | 7/2021 | Lee | H04W 48/06 |
| 2021/0258842 A1* | 8/2021 | Fiorese | H04W 36/36 |
| 2021/0329479 A1* | 10/2021 | Al-Dulaimi | H04W 24/10 |
| 2022/0014888 A1* | 1/2022 | S Bykampadi | H04L 67/16 |
| 2022/0046101 A1* | 2/2022 | Zhang | H04L 67/51 |

(Continued)

OTHER PUBLICATIONS

S Bykampadi; Nagendra, Enhanced Identification in communication networks, Foreign Priority document to US 2022/0014888, India IN202041029205, filed Jul. 9, 2020 (Year: 2020).*

(Continued)

*Primary Examiner* — Nicholas R Taylor
*Assistant Examiner* — Ho T Shiu

(57) ABSTRACT

A Service Communication Proxy (SCP) serves network topology data. The SCP comprises communication circuitry and Application Programming Interface (API) circuitry. The communication circuitry receives Network Function (NF) messages from sending NFs for delivery to an NF type. The communication circuitry routes the NF messages to receiving NFs of the NF type. The communication circuitry maintains network topology data responsive to the routing of the NF messages from the sending NFs to the receiving NFs. The API circuitry receives an API call for the network topology data. The API circuitry retrieves the network topology data from the communication circuitry. The API circuitry transfers an API response having the network topology data.

20 Claims, 7 Drawing Sheets

(56) References Cited

U.S. PATENT DOCUMENTS

2022/0321607 A1* 10/2022 Peinado Gomez . H04W 12/088
2022/0330085 A1* 10/2022 Li ........................ H04L 67/565

OTHER PUBLICATIONS

Ericsson, "Indirect communication for service-based architecture in 5G core", https://www.ericsson.com/4a45a4/assets/local/reports-papers/white-papers/08252021-indirect-communication-for-service-based-architecture.pdf, Aug. 2021 (Year: 2021).*

* cited by examiner

SERVICE COMMUNICATION PROXY (SCP) THAT SERVES NETWORK TOPOLOGY DATA

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The network cores comprise computing devices that execute software to form Network Functions (NFs). The network cores implement a Network Function Virtualization Infrastructure (NFVI) to host the NFs. The network cores use the NFs to provide wireless data services to the wireless user devices over the RANs. Exemplary network functions include Access and Mobility Management Functions (AMFs), Session Management Functions (SMFs), User Plane Functions (UPFs), and Network Repository Functions (NRFs).

An NF discovers another NF through an NRF, and the NFs communicate directly. The NF also discovers a Service Communication Proxies (SCP) through the NRF and communicates with the other NF over the SCP. The SCP is configured with routing data. The SCP receives messages from the NF and routes the messages to the other NF based on the routing data. The communication pathway between the NF and the other NF is referred to as network topology. A Network Data Analytics Functions (NWDAF) receives network topology data from the NF. The NWDAF serves near real time topology data to network operators. The NWDAF topology data only reflects past events and not live status. The NWDAF does not effectively communicate with the SCP. The SCP does not provide helpful information to the NFs and is not wireless network service aware. Unfortunately, the wireless network cores do not effectively and efficiently expose network topology data.

TECHNICAL OVERVIEW

A Service Communication Proxy (SCP) serves network topology data. The SCP comprises communication circuitry and Application Programming Interface (API) circuitry. The communication circuitry receives Network Function (NF) messages from sending NFs for delivery to an NF type. The communication circuitry routes the NF messages to receiving NFs of the NF type. The communication circuitry maintains the network topology data responsive to the routing of the NF messages from the sending NFs to the receiving NFs. The API circuitry receives an API call for at least some of the network topology data. The API circuitry retrieves the network topology data from the communication circuitry. The API circuitry transfers an API response having the requested network topology data.

DETAILED DESCRIPTION

Figure 1:
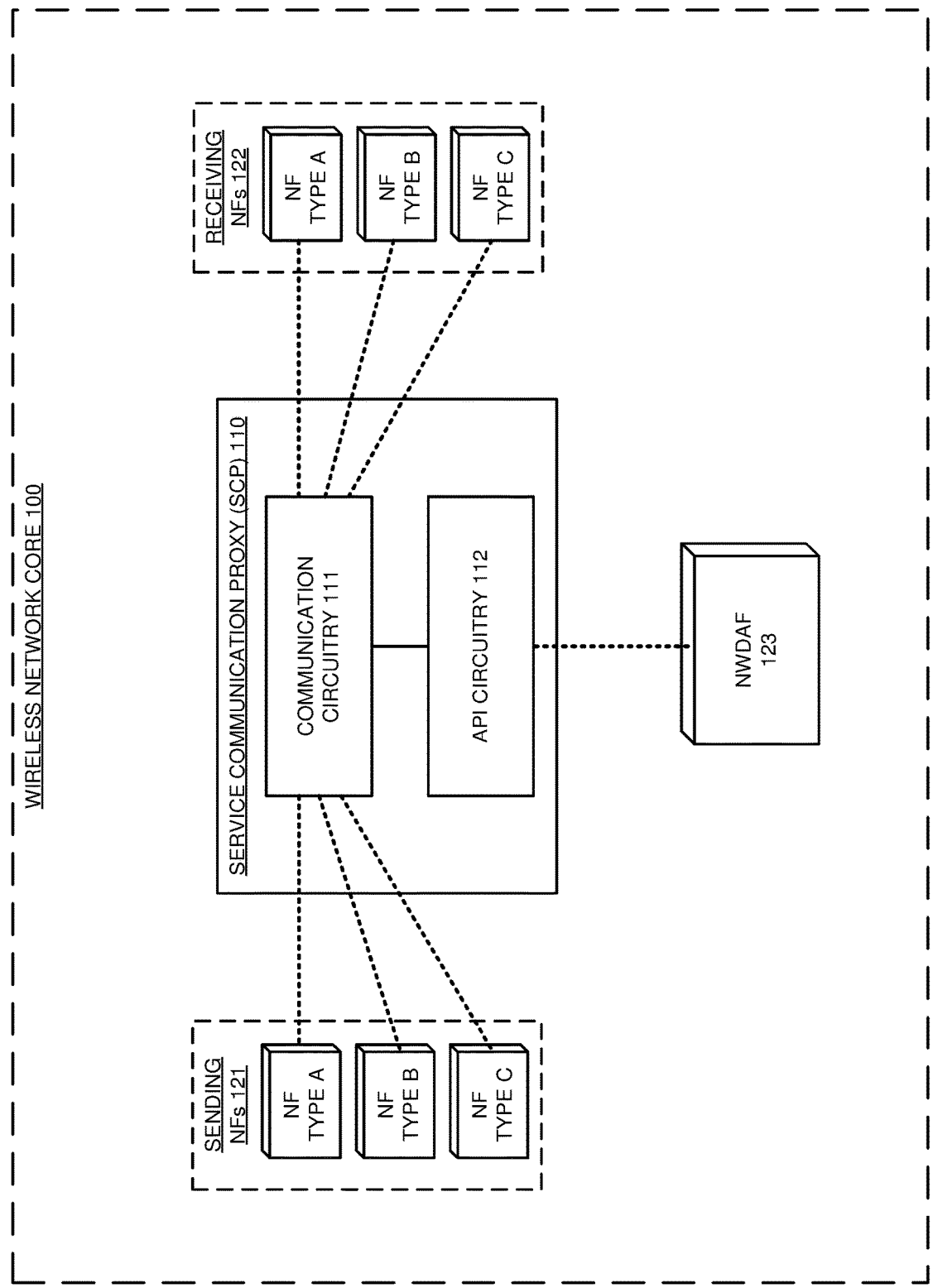
FIG. 1 illustrates a wireless network core to serve network topology data.

FIG. 1 illustrates wireless network core 100 to serve a network topology data. Wireless network core 100 delivers services to wireless user devices over Radio Access Networks (RANs) like internet-access, machine communications, media-streaming, or some other data communications product. Wireless network core 100 comprises Service Communication Proxy (SCP) 110, sending Network Functions (NFs) 121, receiving NFs 122, and Network Data Analytics Function (NWDAF) 123. SCP 110 comprises communication circuitry 111 and Application Programing Interface (API) circuitry 112. Sending NFs 121 comprise a set of NFs that transfer NF messages to SCP 110. Receiving NFs 122 comprise a set of NFs that receive NF messages from SCP 110. NFs 121-122 comprise different NF types. Although SCP 110 is depicted in wireless network core 100, SCP 110 may be deployed in other networking systems like edge computing systems, distributed cores, enterprise data systems, or other types of networking systems.

Various examples of network operation and configuration are described herein. In some examples, communication circuitry 111 receives NF messages from sending NFs 121 for delivery to an NF type. Communication circuitry 111 routes the NF messages to receiving NFs 122 of the NF type. Communication circuitry 111 maintains network topology data responsive to the routing of the NF messages from the sending NFs 121 to the receiving NFs 122. The network topology data indicates sending ones of NFs 121 and receiving ones of NFs 122 that are in communication. API circuitry 112 receives an API call for at least some of the network topology data. For example, NWDAF 123 may transfer an API call for network topology data associated with NF type A of sending NFs 121. API circuitry 112 retrieves the network topology data from communication circuitry 111. API circuitry 112 transfers an API response having the requested network topology data. Advantageously, SCP 410 effectively receives API calls and efficiently exposes network topology data for sending NFs 121 and receiving NFs 122.

NFs 121-122 comprise network functions like Access and Mobility Management functions (AMFs), Session Management Functions (SMFs), and User Plane Functions (UPFs). SCP 110, NFs 121-122, and NWDAF 123 comprise microprocessors, software, memories, transceivers, bus circuitry, and the like. The microprocessors comprise Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems and network functions. The microprocessors retrieve the software from the memories and execute the software to drive the operation of wireless communication network 100 as described herein.

SCP 110, NFs 121-122, and NWDAF 123 communicate over various links that use metallic links, glass fibers, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, virtual switching, inter-processor communication, bus interfaces, and/or some other data communication protocols.

Figure 2:
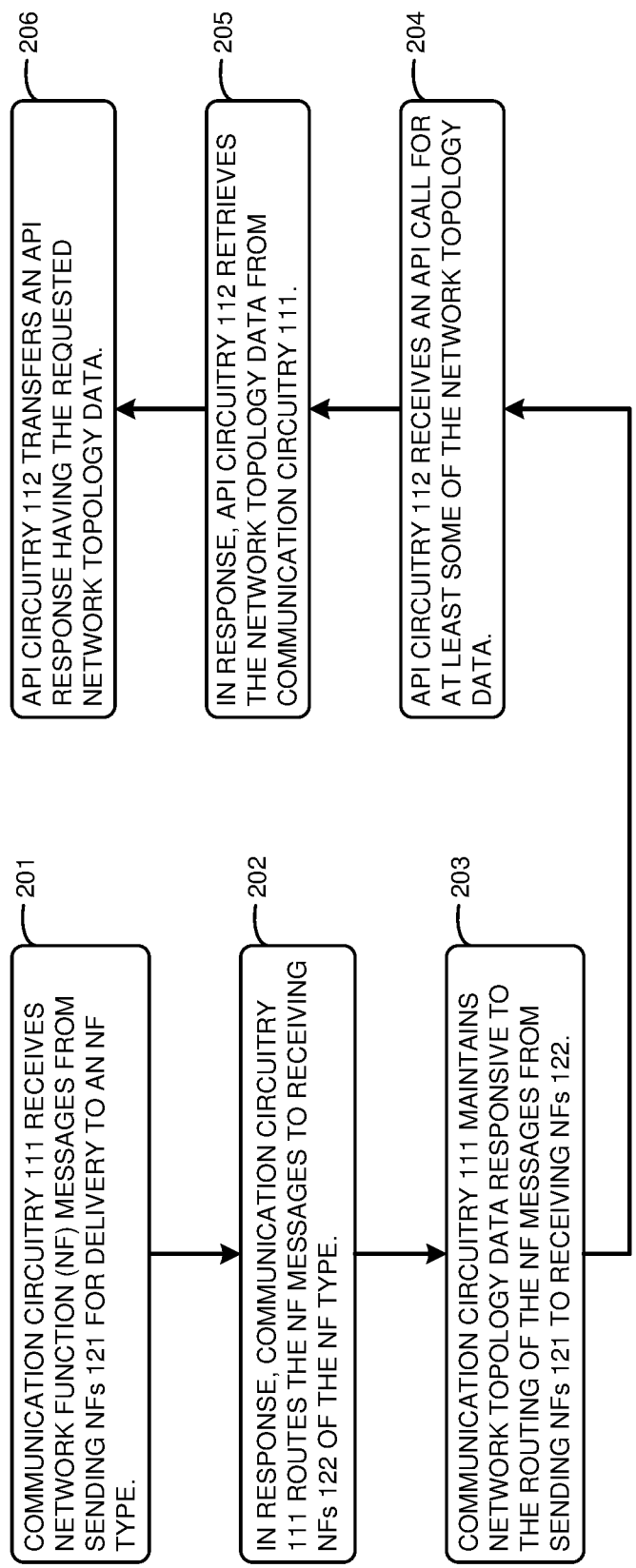
FIG. 2 illustrates an exemplary operation of the wireless network core to serve network topology data.

FIG. 2 illustrates an exemplary operation of wireless network core 100 to serve network topology data. The operation may vary in other examples. Communication circuitry 111 receives NF messages from sending NFs 121 for delivery to an NF type (201). In response, communication circuitry 111 routes the NF messages to receiving NFs 122 of the NF type (202). Communication circuitry 111 maintains network topology data responsive to the routing of the NF messages from sending NFs 121 to receiving NFs 122 (203). API circuitry 112 receives an API call for at least some of the network topology data (204). In response, API circuitry 112 retrieves the network topology data from communication circuitry 111 (205). API circuitry 112 transfers an API response having the requested network topology data (206).

Figure 3:
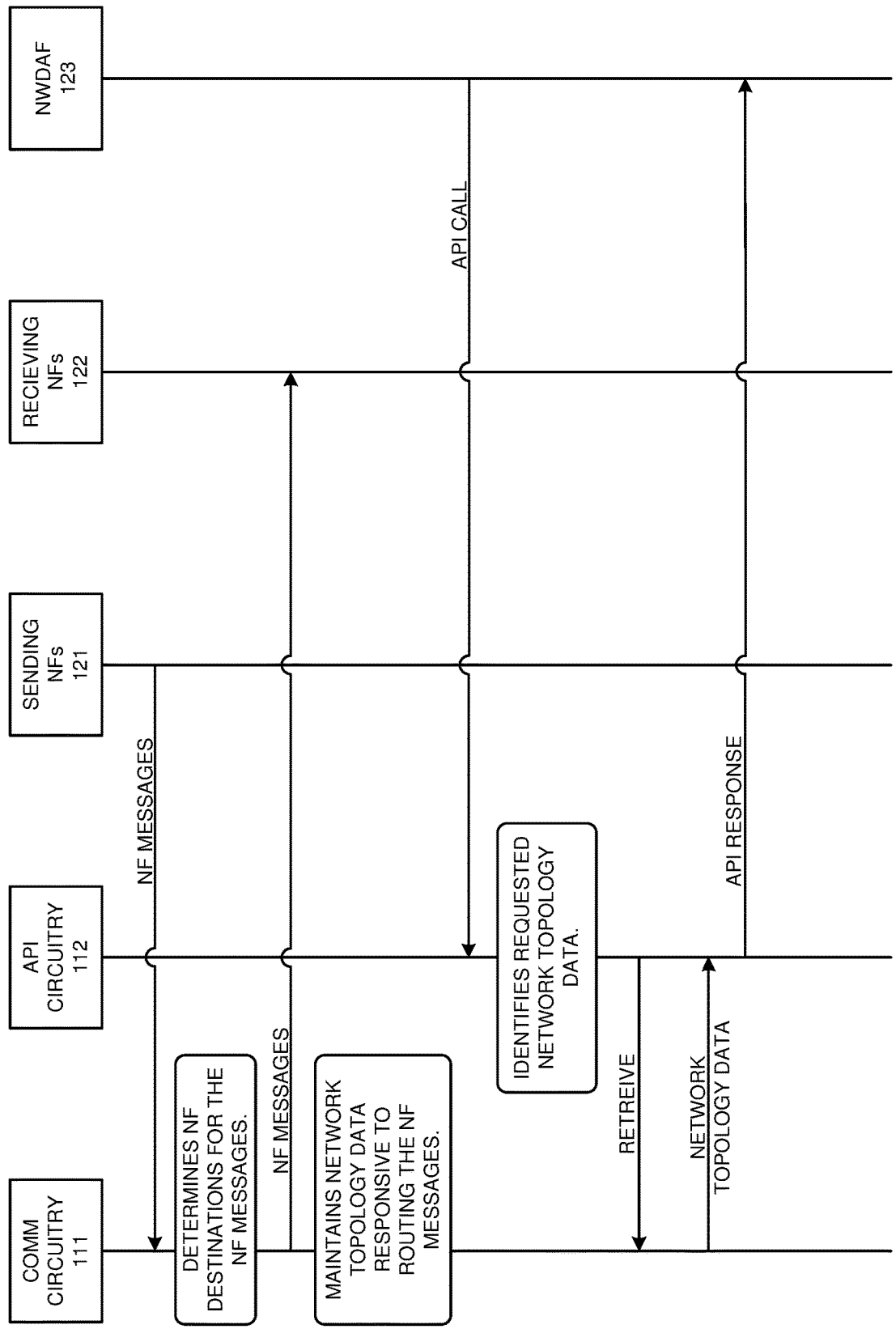
FIG. 3 illustrates another exemplary operation of the wireless network core to serve network topology data.

FIG. 3 illustrates an exemplary operation of wireless network core 100 to serve network topology data. The operation may vary in other examples. Sending NFs 121 transfer NF messages to communication circuitry 111 for delivery to an NF type. For example, NF type B of sending NFs 121 may transfer NF messages to communication circuitry 111 for delivery to NF type C of receiving NFs 122. Communication circuitry 111 determines the NF destinations for the NF messages. Communication circuitry 111 routes the NF messages to receiving NFS 122. For example, communication circuitry 111 may determine that an NF message is marked for delivery to NF type B of receiving NFs 122 and responsively route that NF message to NF type B. Communication circuitry 111 maintains network topology data responsive to the routing the NF messages. The network topology data identifies NFs of sending NFs 121 and NFs of receiving NFs 122 that are in communication with each other. For example, the network topology data may indicate that NF type A in sending NFs 121 has established communication links with NF type A, B, and C of receiving NFs 122. The network topology data may comprise the NF address for NFs 121-122.

NWDAF 123 transfers an API call to API circuitry 112 for network topology data for one or more of NFs 121-122. For example, the API call may request the network topology data associated with NF type C of sending NFs 121 and with NF type A of receiving NFs 122. In response to the API call, API circuitry 112 identifies the requested network topology data. API circuitry 112 retrieves the requested network topology data for communication circuitry 111. Communication circuitry 111 transfers the network topology data to API circuitry 112. API circuitry 112 transfers an API response that indicates the requested network topology data to NWDAF 123. NWDAF 123 receives the API response from API circuitry 112.

Figure 4:
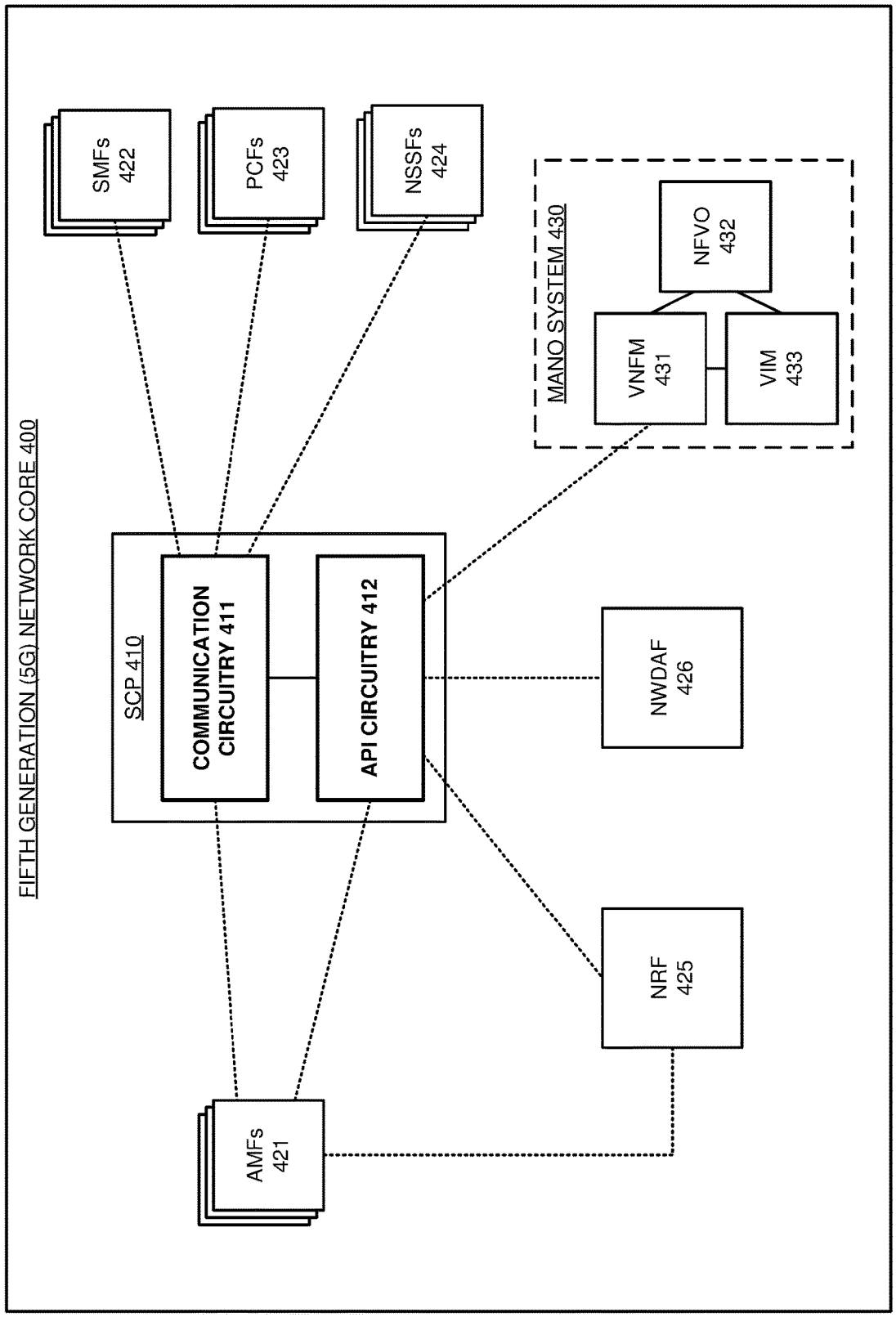
FIG. 4 illustrates a Fifth Generation (5G) network core to serve network topology data.

FIG. 4 illustrates Fifth Generation (5G) network core 400 to serve network topology data. 5G network core 400 comprises an example of wireless network core 100, although network 100 may differ. 5G network core 400 comprises Service Communication Proxy (SCP) 410, Access and Mobility Management Functions (AMFs) 421, Session Management Functions (SMFs) 422, Policy Control Functions (PCFs) 423, Network Slice Selection Functions (NSSFs) 424, Network Repository Function (NRF) 425, Network Data Analytics Function (NWDAF) 426, and Management and Organization (MANO) system 430. SCP 410 comprises communication circuitry 411 and Application Programming Interface (API) circuitry 412. MANO system 430 comprises Virtual Network Function Manager (VNFM) 431, Network Function Virtualization Orchestrator (NFVO) 432, and Virtualized Infrastructure Manager (VIM) 433. Other network functions and network elements are typically present in 5G network core 400 but are omitted for clarity.

AMFs 421 transfer Network Function (NF) discovery requests to NRF 425. The NF discovery requests indicate requests to establish communication links with a NFs 422-424. NRF 425 determines that AMFs 421 will not be able to establish direct communications with NFs 422-424. NRF 425 maintains an SCP profile for SCP 410 that indicates locations and NFs reachable over SCP 410. NRF 425 determines that SCP 410 can establish communication links between AMFs 421 and NFs 422-424 based on the SCP profile for SCP 410. NRF 425 transfers NF discovery responses that indicate SCP 410. AMFs 421 receive the NF discovery responses indicating SCP 410. AMFs 421 transfer NF messages to communications circuitry 411 in SCP 410 to establish communications with NFs 422-424. The NF messages comprise IP messages and/or NF service requests for a specific wireless network service. For example, the NF service requests may indicate that an instance of AMFs 421 requires user subscription information from an instance of PCFs 423.

Communications circuitry 411 drives API circuitry 412 to retrieve NF selection criteria and NF routing data from NRF 425. API circuitry 412 generates an API call that requests the NF selection criteria and routing data. API circuitry 412 transfers the API call to NRF 425. NRF 425 transfers an API response that indicates NF routing data and indicates location, load, capabilities, and or some other type of NF selection criteria to API circuitry 412. API circuitry 412 transfers the selection criteria and routing data to communications circuitry 411. In response to the NF messages sent by AMFs 421, communications circuitry 411 selects NF instances of SMFs 422, PCFs 423, and NSSFs 424 based on the NF selection criteria. Communications circuitry 411 routes the NF service requests sent by AMFs 421 to the selected NF instances of SMFs 422, PCFs 423, and NSSFs 424 based on the routing data.

Communications circuitry 411 traces NF messages sent by AMFs 421 to NF endpoints in NFs 422-424 to generate the network topology data. Communications circuitry 411 maintains network topology data for AMFs 421 and NFs 422-424 based on the traced NF messages. The network topology data indicates AMF instances of AMFs 421 and corresponding NF instances of NFs 422-424 that are in communication. The network topology data may indicate NF message age, NF message route, NF message occurrence frequency, NF message data size, and/or some other topological indication. For example, the network topology data may comprise a network address pair of an AMF instance of AMFs 421 and a SMF instance of SMFs 422 that are in communication. Although SCP 410 is depicted routing messages between AMFs 421 and NFs 422-424, SCP 410 may route messages and maintain network topology data for other types of functions and elements like User Plane Functions (UPFs), Unified Data Managers (UDMs), and the like.

NWDAF 426 receives a network topology request for topology data associated with AMFs 421 and NFs 422-424 from a network operator. The topology data may comprise service specific network topology data, Internet Protocol (IP) topology data, and/or some other type of topology data associated with AMFs 421 and NFs 422-424. NWDAF 426 generates an API call to retrieve the network topology data associated with AMFs 421 and NFs 422-424. NWDAF 426 transfers the API call to API circuitry 412. API circuitry 412 receives the API call and responsively retrieves the requested network topology data associated with AMFs 421 and NFs 422-424 from communication circuitry 411. API circuitry 412 generates an API response indicating the requested topology data. API circuitry 412 transfers the API response to NWDAF 426. NWDAF 426 reports the network topology data to the network operator.

In some examples, AMFs 421 may transfer API calls to API circuitry 412 to retrieve network topology data. For example, an instance of AMFs 421 may wish to determine which instances of NFs 422-424 other instances of AMFs 421 are communicating with. AMFs 421 generate API calls to retrieve the network topology data associated with AMFs 421 and NFs 422-424. AMFs 421 transfer the API calls to API circuitry 412. API circuitry 412 receives the API calls and responsively requests the network topology data associated with AMFs 421 and NFs 422-424 from communication circuitry 411. Communication circuitry 411 transfers the topology data to API circuitry 412. API circuitry 412 generates an API response indicating the requested topology data. API circuitry 412 transfers the API response to AMFs 421.

In some examples, SCP 410 may comprise a network function. In this case, SCP 410 may communicate with VNFM 431 in MANO system 430. NFVO 432 receives a network topology request for topology data associated with AMFs 421 and NFs 422-424. NFVO 432 drives VNFM 431 to retrieve the requested network topology data from SCP 410. VNFM 431 generates an API call to retrieve the requested network topology data associated with AMFs 421 and NFs 422-424. VNFM 431 transfers the API call to API circuitry 412. API circuitry 412 receives the API call and responsively retrieves the requested network topology data associated with AMFs 421 and NFs 422-424 from communication circuitry 411. Communication circuitry 411 transfers the network topology data to API circuitry 412. API circuitry 412 generates an API response indicating the requested topology data. API circuitry 412 transfers the API response to VNFM 431. VNFM 431 receives the API response and indicates the requested network topology data to NFVO 432. NFVO 432 reports the network topology data to the network operator. In some examples, SCP 410 may not comprise a network function. In this case, SCP 410 may communicate with VNFM 431 in MANO system 430 through an intermediary network function. For example, SCP 410 may utilize an Application Function (AF) to facilitate communications between SCP 410 and VNFM 431.

In some examples, SCP 410 may transfer API calls to NRF 425 hide SCP 410 from NF discovery. For example, SCP 410 may need to undergo maintenance and will be unable to serve NFs for a period of time. API circuitry 412 generates an API call to hide SCP 410 from NF discovery. API circuitry 412 transfers the API call to hide SCP 410 to NRF 425. NRF 425 receives the API call and responsively hides SCP 410 from NF discovery. NRF 425 transfers an API response that indicates SCP 410 is hidden to API circuitry 412. NRF 425 directs NFs 421-424 to stop communicating over SCP 410 and to use other SCPs to reestablish communications when SCP 410 is hidden. When SCP 410 is hidden, API circuitry 412 generates and transfers an API call to advertise SCP 410 for NF discovery to NRF 425. For example, SCP 410 a maintenance period for SCP 410 may be over and SCP 410 can resume serving NFs 421-424. NRF 425 receives the API call and advertises SCP 410 for NF discovery. NRF 425 transfers an API response indicating that SCP 410 is discoverable to API circuitry 412.

Figure 5:
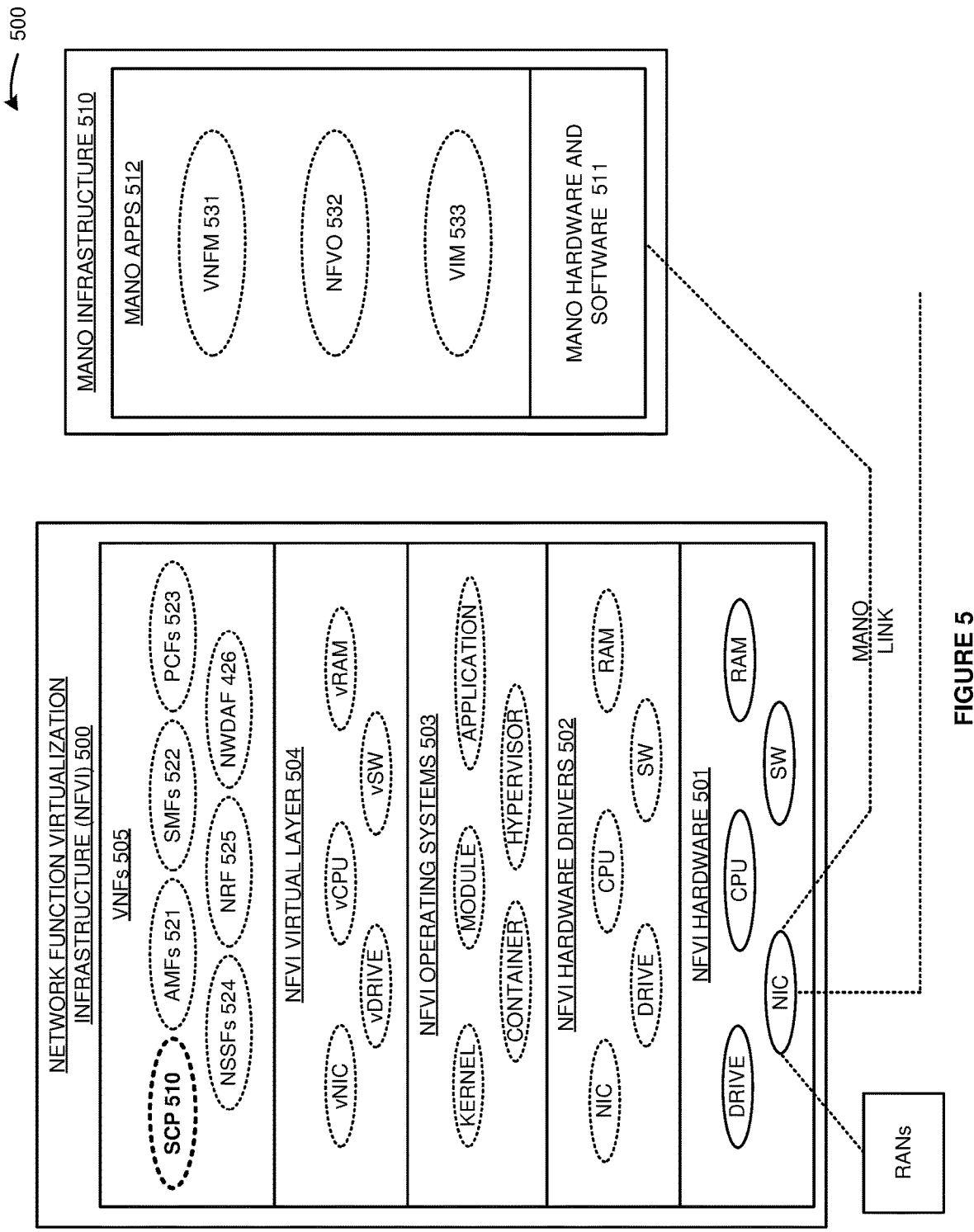
FIG. 5 illustrates a Network Function Virtualization Infrastructure (NFVI) and a Management and Orchestration (MANO) infrastructure in the 5G network core.

FIG. 5 illustrates Network Function Virtualization Infrastructure (NFVI) 500 and MANO infrastructure 510 in 5G network core 400. NFVI 500 comprises an example of SCP 110 and network functions 121-123, although SCP 110 and functions 121-123 may vary from this example. NFVI 500 comprises Network Function Virtualization Infrastructure (NFVI) hardware 501, NFVI hardware drivers 502, NFVI operating systems 503, NFVI virtual layer 504, and NFVI Virtual Network Functions (VNFs) 505. NFVI hardware 501 comprises Network Interface Cards (NICs), CPU, RAM, Flash/Disk Drives (DRIVE), and Data Switches (SW). NFVI hardware drivers 502 comprise software that is resident in the NIC, CPU, RAM, DRIVE, and SW. NFVI operating systems 503 comprise kernels, modules, applications, containers, MANO agents, and the like. NFVI virtual layer 504 comprises vNIC, vCPU, vRAM, vDRIVE, and vSW. NFVI VNFs 505 comprise SCP 510, AMFs 521, SMFs 522, PCFs 523, NSSFs 524, NRF 525, and NWDAF 526. Other VNFs and network elements like Authentication Server Function (AUSFs), Unified Data Managers (UDMs), Unified Data Registries (UDRs), and Network Exposure Functions (NEFs) are typically present but are omitted for clarity.

MANO infrastructure 510 comprises MANO hardware and software 511 and MANO applications (APPS) 512. MANO hardware and software 511 comprises MANO hardware, MANO hardware drivers, MANO operating systems, and a MANO virtual layer. The MANO hardware comprises NICs, CPU, RAM, flash/disk drives, and data switches. The MANO hardware drivers comprise software that is resident in the NIC, CPU, RAM, flash/disk drives, and data switches. The MANO operating systems comprise kernels, modules, applications, containers, hypervisors, and the like. The MANO virtual layer comprises vNIC, vCPU, vRAM, virtual flash/disk drives, and virtual data switches. MANO applications 512 comprise VNFM 531, NFVO 532, and VIM 533. Other MANO applications are typically present but are omitted for clarity.

NFVI 500 and MANO infrastructure 510 may be located at a single site or be distributed across multiple geographic locations. The NIC in NFVI hardware 501 is coupled to Radio Access Networks (RANs), to external systems, and to a NIC in MANO hardware and software 511 over a MANO link. NFVI hardware 501 executes NFVI hardware drivers 502, NFVI operating systems 503, NFVI virtual layer 504, and NFVI VNFs 505 to form SCP 410, AMFs 421, SMFs 422, PCFs 423, NSSFs 424, NRF 425, and NWDAF 426. The MANO hardware in MANO hardware and software 511 executes the MANO hardware drivers, MANO operating systems, MANO virtual layer, and MANO applications 512 to form VNFM 431, NFVO 432, and VIM 433.

Figure 6:
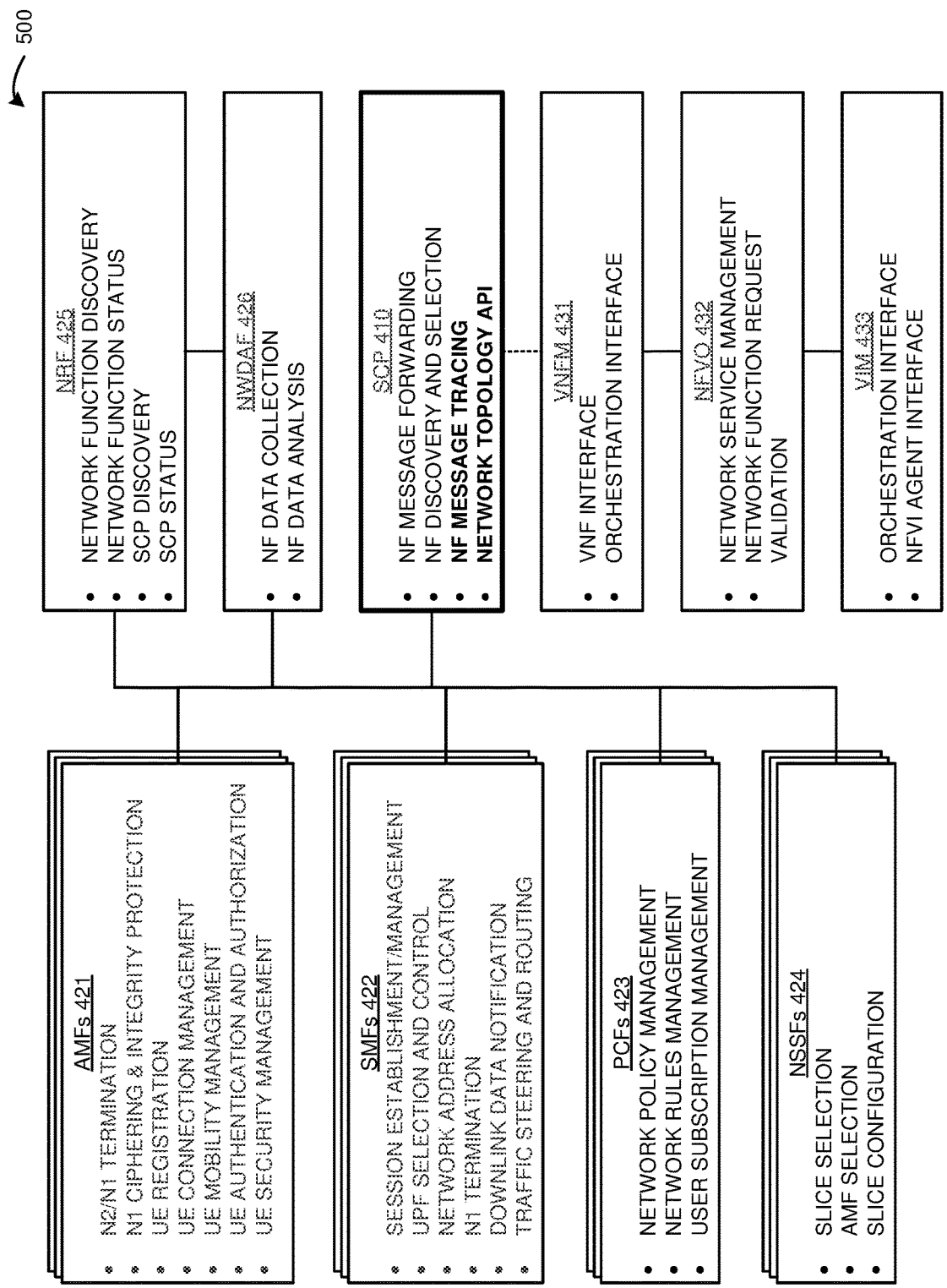
FIG. 6 further illustrates the NFVI and MANO infrastructure in the 5G network core.

FIG. 6 further illustrates NFVI 500 and MANO architecture 510 in 5G network core 400. SCP 410 performs NF message forwarding, NF discovery and selection, NF message tracing, and provides a network topology API. AMFs 421 perform N2 termination, N1 termination, UE ciphering & integrity protection, UE registration and connection, UE connection/mobility management, UE authentication and authorization, and UE short messaging. SMFs 422 perform session establishment and management, UPF selection and control, network address allocation, N1 termination, downlink data notification, and traffic steering and routing. PCFs 423 perform network policy management, network rules management, and user subscription management. NSSFs 424 perform slice selection, AMF selection, and slice configuration. NRF 425 performs network function discovery, network function status monitoring. SCP discovery, and SCP status monitoring. NWDAF 426 performs NF data collection and NF data analysis. VNFM 431 provides a VNF interface and an orchestration interface. NFVO 432 performs network service management and network function request validation. VIM 433 provides an orchestration interface and an NFVI interface.

In this example, SCP 410 serves IP topology data for NFs 421-424, however in other examples, SCP 410 serves other types of topology data. AMFs 421 transfer NF discovery requests to NRF 425 to establish communication links with a NFs 422-424. NRF 425 maintains an SCP profile for SCP 410 that indicates NFs 422-424 are reachable over SCP 410. NRF 425 transfers NF discovery responses that direct AMFs 421 to communication with NFs 422-424 over SCP 410. AMFs 421 receive the NF discovery responses indicating SCP 410. AMFs 421 transfer IP messages to communications circuitry 411 in SCP 410 to establish communications between AMFs 421 and NFs 422-424.

Communications circuitry 411 drives API circuitry 412 to retrieve NF selection criteria and NF routing data from NRF 425. API circuitry 412 generates an API call that requests the NF selection criteria and routing data. API circuitry 412 transfers the API call to NRF 425. NRF 425 transfers an API response that indicates NF routing data and selection criteria for NFs 422-424 to API circuitry 412. API circuitry 412 transfers the selection criteria to communications circuitry 411. In response to the IP messages from AMFs 421, communications circuitry 411 selects NF instances of SMFs 422, PCFs 423, and NSSFs 424 for AMFs 421 based on the NF selection criteria. Communications circuitry 411 routes the IP messages sent by AMFs 421 to the selected NF instances of SMFs 422, PCFs 423, and NSSFs 424 based on the routing data. Communications circuitry 411 traces IP messages sent by AMFs 421 to NFs 422-424 to generate IP topology data. Communication circuitry 411 maintains the IP topology data. The IP topology data may indicate IP message age, frequency, size, or some other topological indicator for NFs 421-424. Communication circuitry 411 updates the IP topology data in response to the creation and termination of the communication links between AMFs 421 and NFs 422-424.

NWDAF 426 receives a network topology request for IP topology data for AMFs 421 and SMFs 422. NWDAF 426 generates an API call to retrieve the IP topology data for AMFs 421 and SMFs 422. NWDAF 426 transfers the API call to API circuitry 412. API circuitry 412 receives the API call and responsively retrieves the requested IP topology data for AMFs 421 and SMFs 422 from communication circuitry 411. Communication circuitry 411 transfers the topology data to API circuitry 412. API circuitry 412 generates an API response indicating IP topology data for AMFs 421 and SMFs 422. API circuitry 412 transfers the API response to NWDAF 426. NWDAF 426 reports the IP topology data for AMFs 421 and SMFs 422 to the network operator.

NFVO 432 receives a network topology request for IP topology data for AMFs 421 and PCFs 423. NFVO 432 drives VNFM 431 to retrieve the requested network topology data from SCP 410. VNFM 431 generates an API call to retrieve the IP topology data for AMFs 421 and PCFs 423. VNFM 431 transfers the API call to API circuitry 412. API circuitry 412 receives the API call and responsively retrieves the IP topology data for AMFs 421 and PCFs 423 from communication circuitry 411. Communication circuitry 411 transfers the IP topology data to API circuitry 412. API circuitry 412 generates an API response indicating the IP topology data. API circuitry 412 transfers the API response to VNFM 431. VNFM 431 receives the API response and indicates the IP topology data to NFVO 432. NFVO 432 reports the IP topology data for AMFs 421 and PCFs 422 to the network operator.

An AMF instance of AMFs 421 generates an API call to API circuitry 412 to retrieve IP topology data for other instances of AMFs 421 and NSSFs 424. The AMF instance of AMFs 421 transfers the API call to API circuitry 412. API circuitry 412 receives the API call and responsively retrieves the IP topology data for the other AMF instances of AMFs 421 and NSSFs 424 from communication circuitry 411. Communication circuitry 411 transfers the IP topology data to API circuitry 412. API circuitry 412 generates an API response indicating the IP topology data for the other AMF instances of AMFs 421 and NSSFs 424. API circuitry 412 transfers the API response to the AMF instance of AMFs 421.

API circuitry 412 generates an API call to hide SCP 410 from NF discovery in response to and SCP maintenance requirement. API circuitry 412 transfers the API call to NRF 425 to hide SCP 410 from NF discovery. The API call indicates current IP topology data for the NFs 421-424. NRF 425 receives the API call and responsively removes SCP 410 from NF discovery responses sent by NRF 425. NRF 425 transfers an API response that indicates SCP 410 is hidden to API circuitry 412. NRF 425 transfers NF instructions to NFs 421-424 to cease communicating over SCP 410. NRF 425 uses the current IP topology data for NFs 421-424 to locate other SCPs (not shown) for NFs 421-424 to communicate over. NRF 425 indicates the other SCPs to NFs 421-424 to reestablish communications over while SCP 410 is hidden. When the maintenance period is over, API circuitry 412 generates and transfers an API call to advertise SCP 410 for NF discovery to NRF 425. NRF 425 receives the API call and includes SCP 410 in NF discovery response sent by NRF 425. NRF 425 transfers an API response indicating that SCP 410 is discoverable to API circuitry 412.

Figure 7:
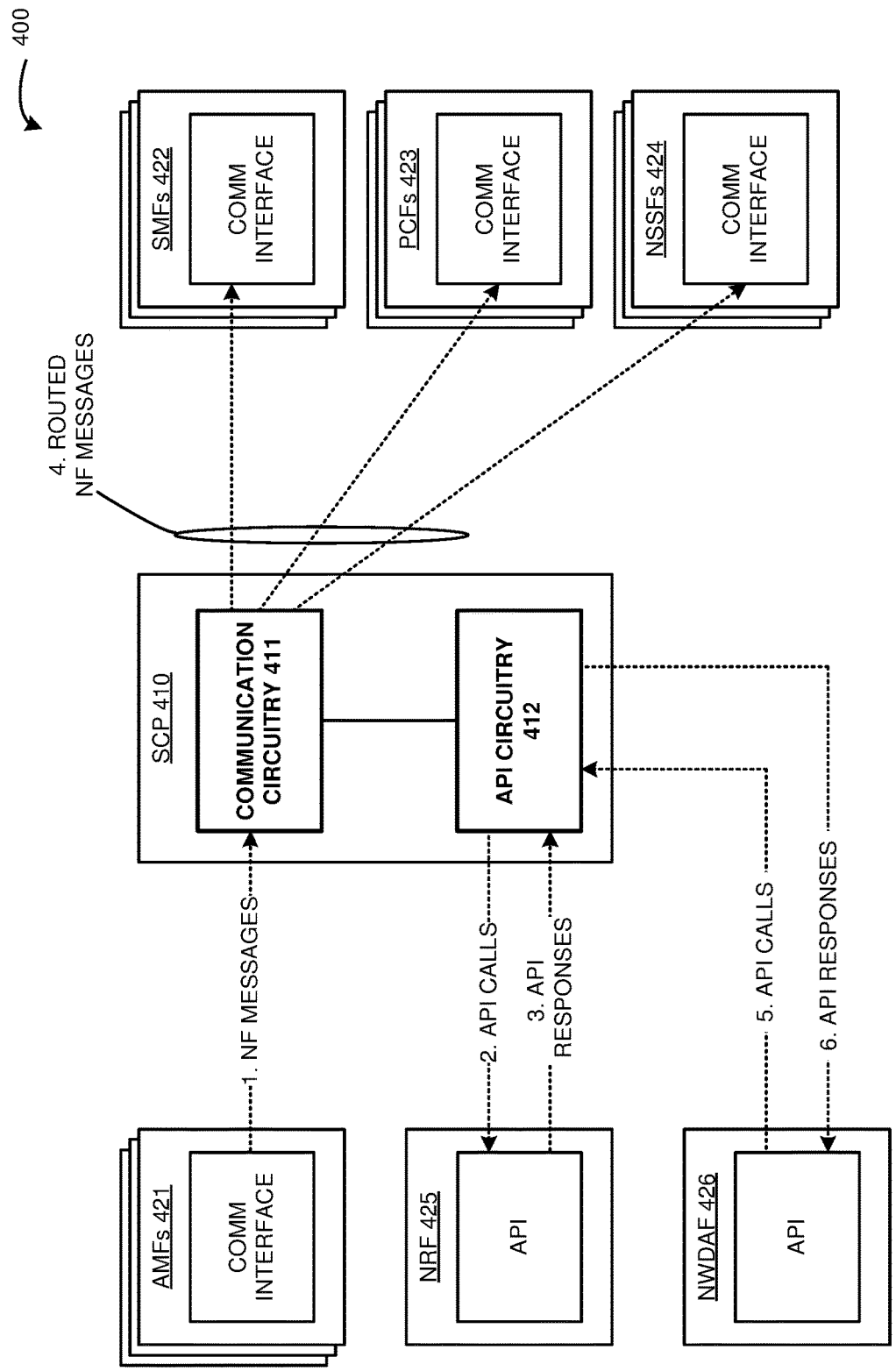
FIG. 7 illustrates an exemplary operation of the 5G network core to serve network topology data.

FIG. 7 illustrates an exemplary operation of 5G network core 400 to serve network topology data. The operation may vary in other examples. In this example, the network topology data comprises network service topology data, however in other examples, the type of topology data may differ.

AMFs 421 transfers NF discovery requests to NRF 425 to establish communication links with a NFs 422-424. NRF 425 maintains an SCP profile for SCP 410 that indicates reachable NFs over SCP 410. NRF 425 determines that SCP 410 can establish communication links between AMFs 421 and NFs 422-424 based on the SCP profile. NRF 425 transfers NF discovery responses that direct AMFs 421 to access NFs 422-424 over SCP 410. Communication interfaces (COMM INTERFACE) in AMFs 421 transfer NF messages to communications circuitry 411. The NF messages indicate specific network services required by AMFs 421. For example, the communications interfaces in AMFs 421 may transfer NF messages that requests slice selection services to communications circuitry 411.

In response to the NF messages, communications circuitry 411 drives API circuitry 412 to retrieve NF selection criteria and NF routing data from NRF 425. API circuitry 412 generates an API call that requests the NF selection criteria and routing data. API circuitry 412 transfers the API call to an API in NRF 425. The API in NRF 425 transfers an API response that indicates NF routing data NF selection criteria to API circuitry 412. API circuitry 412 transfers the selection criteria to communications circuitry 411. Communications circuitry 411 selects NF instances of SMFs 422, PCFs 423, and NSSFs 424 and based on the NF selection criteria and the requested network services. Communications circuitry 411 routes the NF messages sent by AMFs 421 to the selected NF instances of SMFs 422, PCFs 423, and NSSFs 424 based on the routing data.

Communications circuitry 411 traces the NF messages sent by AMFs 421 to NFs 422-424 to generate network service topology data. Communication circuitry 411 maintains the network service topology data. Communication circuitry 411 updates the network service topology data in response to the creation and termination of the communication links between AMFs 421 and NFs 422-424. The network service topology data indicates network services exchanged between AMFs 421 and corresponding NF instances of NFs 422-424. For example, the network topology data may comprise message traces of AMFs 421 requesting slices selection services from NSSFs 424.

NWDAF 426 receives a network topology request for network service topology data for AMFs 421 and NFs 422-424. An API in NWDAF 426 generates an API call to retrieve the network service topology data associated for AMFs 421 and NFs 422-424. NWDAF 426 transfers the API call to API circuitry 412. API circuitry 412 receives the API call. API circuitry 412 requests network service topology data for AMFs 421 and NFs 422-424 from communication circuitry 411. Communication circuitry 411 transfers the network service topology data to API circuitry 412. API circuitry 412 generates an API response indicating the requested network service topology data for AMFs 421 and NFs 422-424. API circuitry 412 transfers the API response to the API in NWDAF 426. NWDAF 426 reports the network service topology data to the network operator.

The wireless data network circuitry described above comprises computer hardware and software that form special-purpose network circuitry to serve network topology data. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve network topology data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Service Communication Proxy (SCP) to serve network core topology data, the method comprising:
    obtaining routing data from a network data repository that indicates how to route network function messages associated with network function services between network functions in a wireless network core;
    receiving the network function messages from sending network functions for delivery to recipient network functions in the wireless network core of different network function types;
    routing the messages based on the routing data to the recipient network functions;
    tracing the messages between the sending network functions and the recipient network functions and responsively maintaining the network core topology data based on the tracing of the messages from the sending network functions to the recipient network functions wherein the network core topology data indicates ones of the sending network functions and ones of the recipient network functions in communication; and
    receiving an Application Programming Interface (API) call for at least some of the network core topology data from a Network Data Analytics Function (NWDAF), and in response, transferring an API response having the at least some of the network core topology data to the NWDAF.

2. The method of claim 1 wherein receiving the API call from the NWDAF and transferring the API response to the NWDAF comprises receiving the API call from the NWDAF for network core topology data for one of the network functions and transferring the API response having the network core topology data for the one of the network functions to the NWDAF.

3. The method of claim 1 wherein:
    obtaining the routing data from the network data repository comprises transferring another API call to a Network Repository Function (NRF) for the routing data and receiving another API response from the NRF indicating the routing data.

4. The method of claim 1 further comprising transferring another API call to a Network Repository Function (NRF) to hide the SCP from NRF discovery wherein the NRF receives the other API call and responsively hides the SCP from NRF discovery.

5. The method of claim 1 further comprising transferring another API call to a Network Repository Function (NRF) to advertise the SCP during NRF discovery wherein the NRF receives the other API call and responsively advertises the SCP during NRF discovery.

6. The method of claim 1 further comprising receiving another API call from one of the sending network functions for at least some of the network core topology data and responsively transferring another API response having the at least some of the network core topology data.

7. The method of claim 1 wherein the SCP comprises a network function.

8. The method of claim 1 wherein:
the SCP comprises a network function; and further comprising:
transferring at least some of the network core topology data to a Virtual Network Function Manager (VNFM) in a Network Function Virtualization Management and Orchestration (NFV MANO) system over an NFV MANO link.

9. The method of claim 1 wherein:
receiving the messages, routing the messages, and maintaining the network core topology data comprises receiving the messages for a specific wireless network service, routing the messages for the specific wireless network service, and maintaining the network core topology data for the specific wireless network service; and
receiving the API call from the NWDAF and transferring the API response to the NWDAF comprises receiving the API call from the NWDAF for the specific wireless network service and transferring the API response having the network core topology data for the specific wireless network service to the NWDAF.

10. The method of claim 1 wherein:
receiving the messages, routing the messages, and maintaining the network core topology data comprises receiving Internet Protocol (IP) messages, routing IP messages, and maintaining IP network core topology data; and
receiving the API call from the NWDAF and transferring the API response to the NWDAF comprises receiving the API call from the NWDAF for the IP network core topology data and transferring the API response having the IP network core topology data to the NWDAF.

11. A Service Communication Proxy (SCP) configured to serve network core topology data, the SCP comprising:
Application Programming Interface (API) circuitry configured to obtain routing data from network data repository that indicates how to route network function messages associated with network function services between network functions in a wireless network core;
the communication circuitry configured to receive the network function messages from sending network functions for delivery to recipient network functions in the wireless network core of different network function types;
the communication circuitry configured to route the messages to the recipient network functions;

the communication circuitry configured to trace the messages between the sending network functions and the recipient network functions and responsively maintain the network core topology data based on the trace of the messages from the sending network functions to the recipient network functions wherein the network core topology data indicates ones of the sending network functions and ones of the recipient network functions in communication; and
the API circuitry configured to receive an API call for at least some of the network core topology data from a Network Data Analytics Function (NWDAF), and in response, retrieve the network core topology data from the communication circuitry and transfer an API response having the at least some of the network core topology data to the NWDAF.

12. The Service Communication Proxy (SCP) of claim 11 wherein the API circuitry is further configured to receive the API call from the NWDAF for network core topology data for one of the network functions, retrieve the network core topology data for the one of the network functions and transfer the API response having the network core topology data for the one of the network functions network functions to the NWDAF.

13. The Service Communication Proxy (SCP) of claim 11 wherein:
the network data repository comprises a Network Repository Function (NRF); and
the API circuitry is further configured to transfer another API call to the NRF for the routing data and receive another API response from the NRF indicating the routing data.

14. The Service Communication Proxy (SCP) of claim 11 wherein the API circuitry is further configured to transfer another API call to a Network Repository Function (NRF) to hide the SCP from NRF discovery wherein the NRF receives the other API call and responsively hides the SCP from NRF discovery.

15. The Service Communication Proxy (SCP) of claim 11 wherein the API circuitry is further configured to transfer another API call to a Network Repository Function (NRF) to advertise the SCP during NRF discovery wherein the NRF receives the other API call and responsively advertises the SCP during NRF discovery.

16. The Service Communication Proxy (SCP) of claim 11 wherein the API circuitry is further configured to receive another API call from the sending network functions for at least some of the network core topology data and responsively transfer another API response having the at least some of the network core topology data.

17. The Service Communication Proxy (SCP) of claim 11 wherein the SCP comprises a network function.

18. The Service Communication Proxy (SCP) of claim 11 wherein:
the SCP comprises a network function; and
the API circuitry is further configured to transfer at least some of the network core topology data to a Virtual Network Function Manager (VNFM) in a Network Function Virtualization Management and Orchestration (NFV MANO) system over an NFV MANO link.

19. The Service Communication Proxy (SCP) of claim 11 wherein:
the communication circuitry is further configured to receive the messages for a specific wireless network service, route the messages for the specific wireless network service, and maintain the network core topology data for the specific wireless network service; and the API circuitry is further configured to receive the API call from the NWDAF for the specific wireless network service, retrieve the network core topology data for the specific wireless network service, and transfer the API response having the network core topology data for the specific wireless network service to the NWDAF.

20. The Service Communication Proxy (SCP) of claim 11 wherein:
the communication circuitry is further configured to receive Internet Protocol (IP) messages, route IP messages, and maintain IP network core topology data; and
the API circuitry is further configured to receive the API call from the NWDAF for the IP network core topology data, retrieve the IP network core topology data, and transfer the API response having the IP network core topology data to the NWDAF.

* * * * *